(12) United States Patent  
Nakajima et al.

(10) Patent No.: US 12,196,773 B2  
(45) Date of Patent: Jan. 14, 2025

(54) AUTOMATIC ANALYSIS DEVICE, COLD STORAGE, AND METHOD FOR COOLING REAGENT IN AUTOMATIC ANALYSIS DEVICE

(71) Applicant: Hitachi High-Tech Corporation, Tokyo (JP)

(72) Inventors: Satoshi Nakajima, Tokyo (JP); Akihiro Yasui, Tokyo (JP); Takeshi Setomaru, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 671 days.

(21) Appl. No.: 17/593,925

(22) PCT Filed: Mar. 4, 2020

(86) PCT No.: PCT/JP2020/009032  
§ 371 (c)(1),  
(2) Date: Sep. 28, 2021

(87) PCT Pub. No.: WO2020/213276  
PCT Pub. Date: Oct. 22, 2020

(65) Prior Publication Data  
US 2022/0178959 A1 Jun. 9, 2022

(30) Foreign Application Priority Data  
Apr. 18, 2019 (JP) .................................. 2019-079262

(51) Int. Cl.  
*G01N 35/00* (2006.01)  
*G01N 35/10* (2006.01)

(52) U.S. Cl.  
CPC ............... *G01N 35/1002* (2013.01); *G01N 2035/00435* (2013.01)

(58) Field of Classification Search  
None  
See application file for complete search history.

(56) References Cited

U.S. PATENT DOCUMENTS

| 4,127,765 A | 11/1978 | Heaney |
| 4,629,862 A * | 12/1986 | Kitagawa ............... C12M 41/12 |
| | | 359/395 |
| 2012/0237398 A1 | 9/2012 | Katsumi et al. |

FOREIGN PATENT DOCUMENTS

| CN | 1576758 A | 2/2005 |
| CN | 208520074 U | 2/2019 |

(Continued)

OTHER PUBLICATIONS

International Search Report (PCT/ISA/210) issued in PCT Application No. PCT/JP2020/009032 dated May 19, 2020 with English translation (six (6) pages).

(Continued)

*Primary Examiner* — Jyoti Nagpaul  
(74) *Attorney, Agent, or Firm* — Crowell & Moring LLP

(57) ABSTRACT

Provided is an automatic analysis device, a cooling box, and a cooling method for a reagent in the automatic analysis device capable of suppressing dew condensation on the outside of the reagent cooling box without increasing an outer diameter of the cooling box and without affecting a reagent temperature. The automatic analysis device 100 is a device that is configured to measure physical properties of reaction liquid in which a sample and a reagent are dispensed respectively and reacted in a reaction container 30, and includes a reagent cooling box 24 that is configured to store a reagent container 106 housing the reagent, and a heating unit that is disposed on an outer peripheral part of the reagent cooling box 24 to heat the outer peripheral part.

17 Claims, 13 Drawing Sheets

(56) References Cited

FOREIGN PATENT DOCUMENTS

| EP | 0 635 689 A2 | 1/1995 |
| JP | 56-140258 A | 11/1981 |
| JP | 8-136110 A | 5/1996 |
| JP | 2007-40900 A | 2/2007 |
| JP | 2007-248084 A | 9/2007 |
| JP | 2012-194071 A | 10/2012 |
| JP | 2013-185980 A | 9/2013 |
| JP | 2018-169278 A | 11/2018 |

OTHER PUBLICATIONS

Japanese-language Written Opinion (PCT/ISA/237) issued in PCT Application No. PCT/JP2020/009032 dated May 19, 2020 (three (3) pages).
Japanese-language International Preliminary Report on Patentability (PCT/IPEA/409) issued in PCT Application No. PCT/JP2020/009032 dated Apr. 27, 2021, including Annexes with partial English translation (21 pages).
Extended European Search Report issued in European Application No. 20791805.3 dated Jan. 13, 2023 (nine (9) pages).
International Preliminary Report on Patentability (PCT/IB/338 & PCT/IPEA/409) issued in PCT Application No. PCT/JP2020/009032 dated Oct. 21, 2021 (four (4) pages).
Chinese-language Office Action issued in Chinese Application No. 202080021524.2 dated May 24, 2024 with English translation (52 pages).

\* cited by examiner

[FIG. 1]
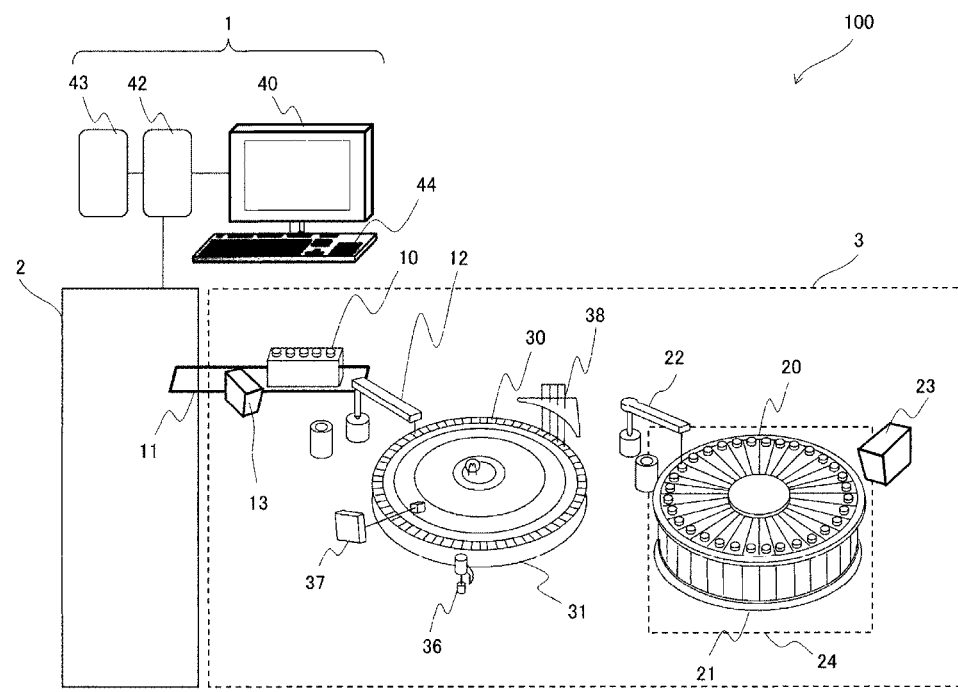

[FIG. 2]
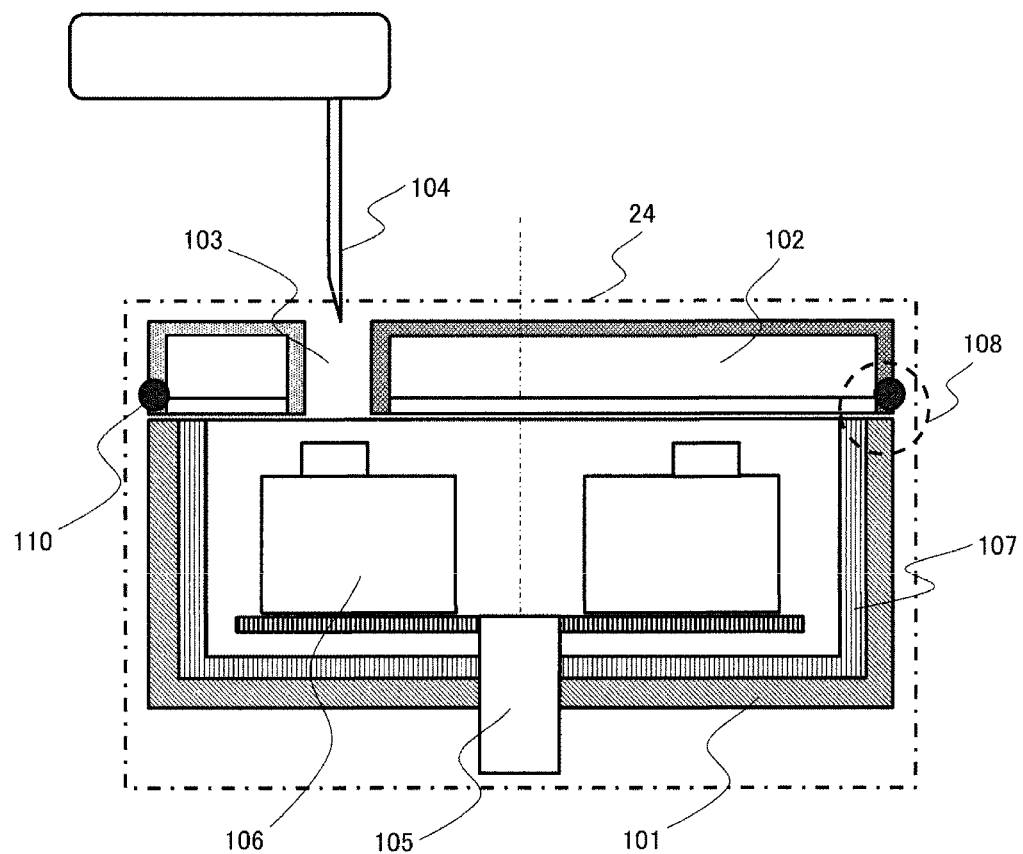

[FIG. 3]
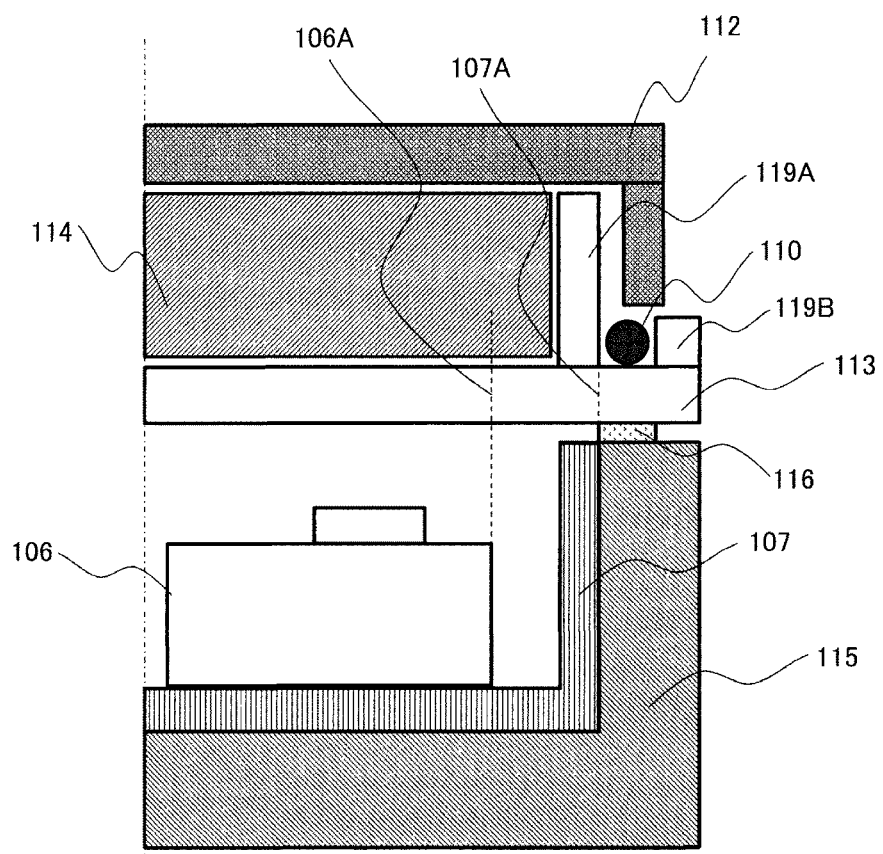

[FIG. 4]
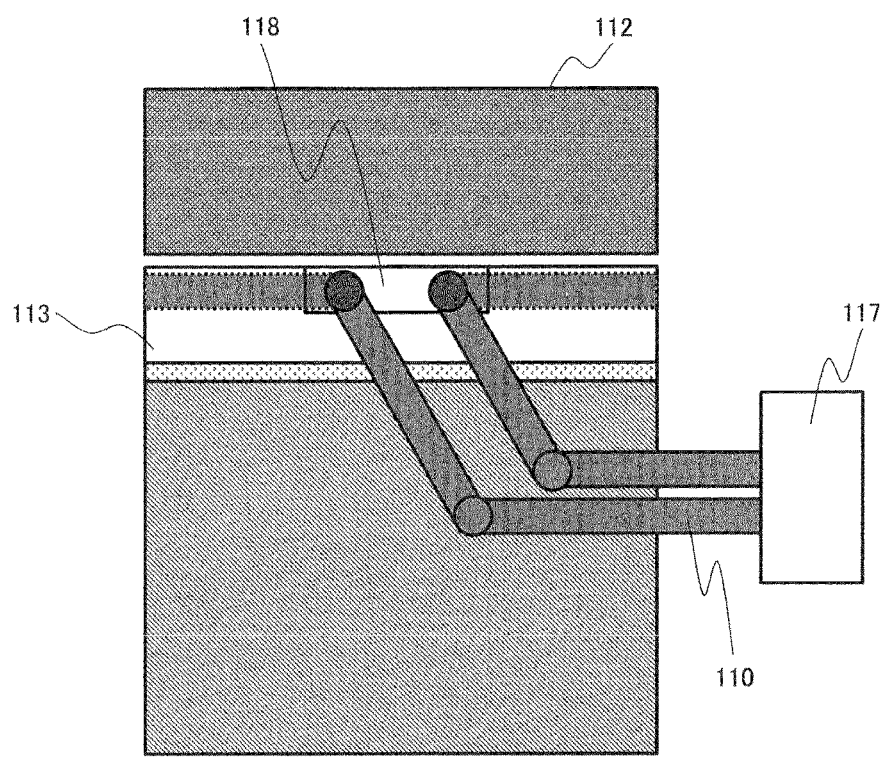

[FIG. 5]
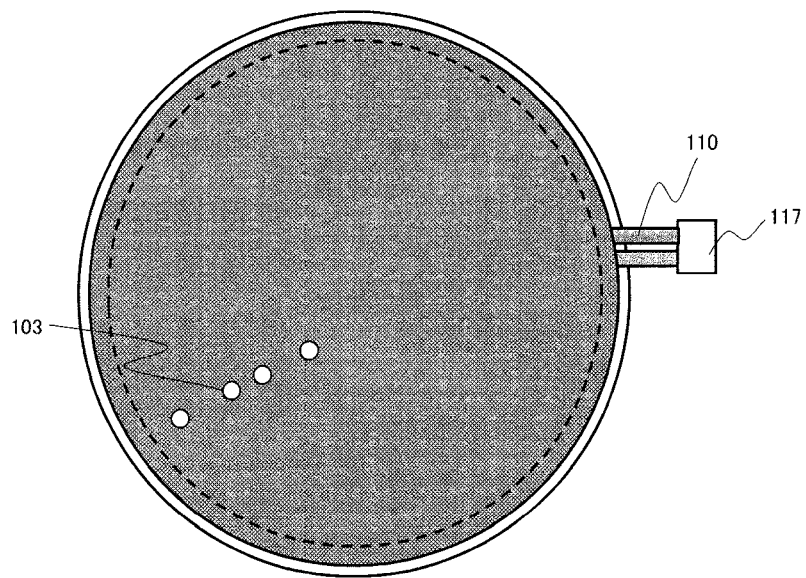

[FIG. 6]
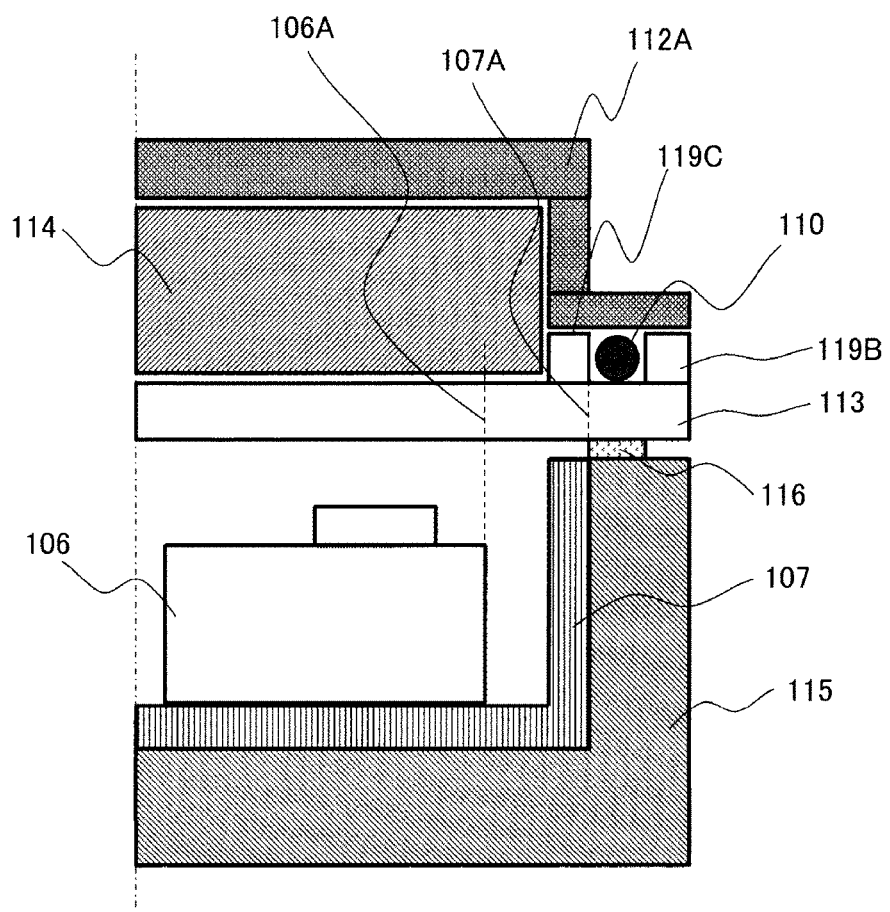

[FIG. 7]
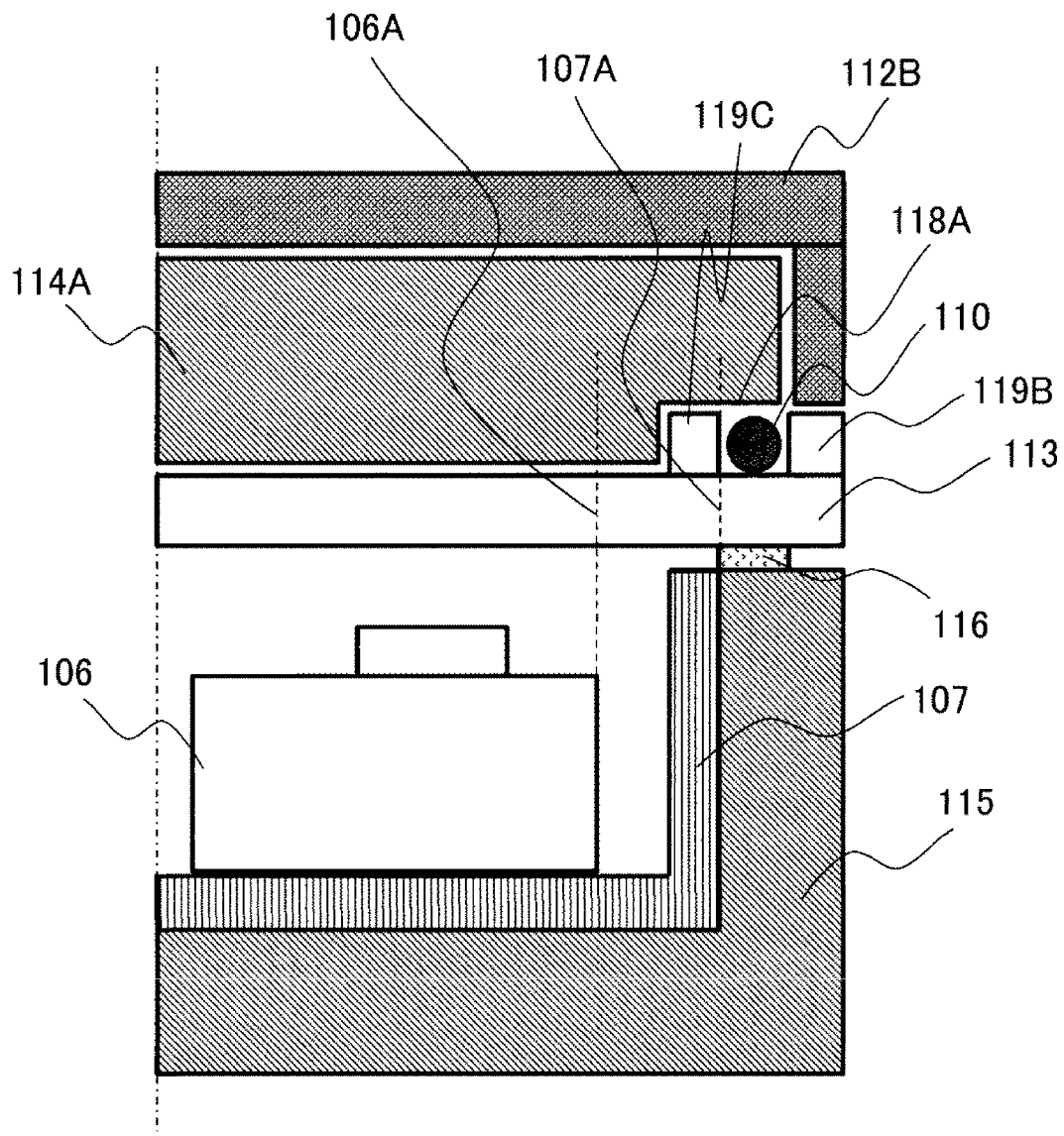

[FIG. 8]
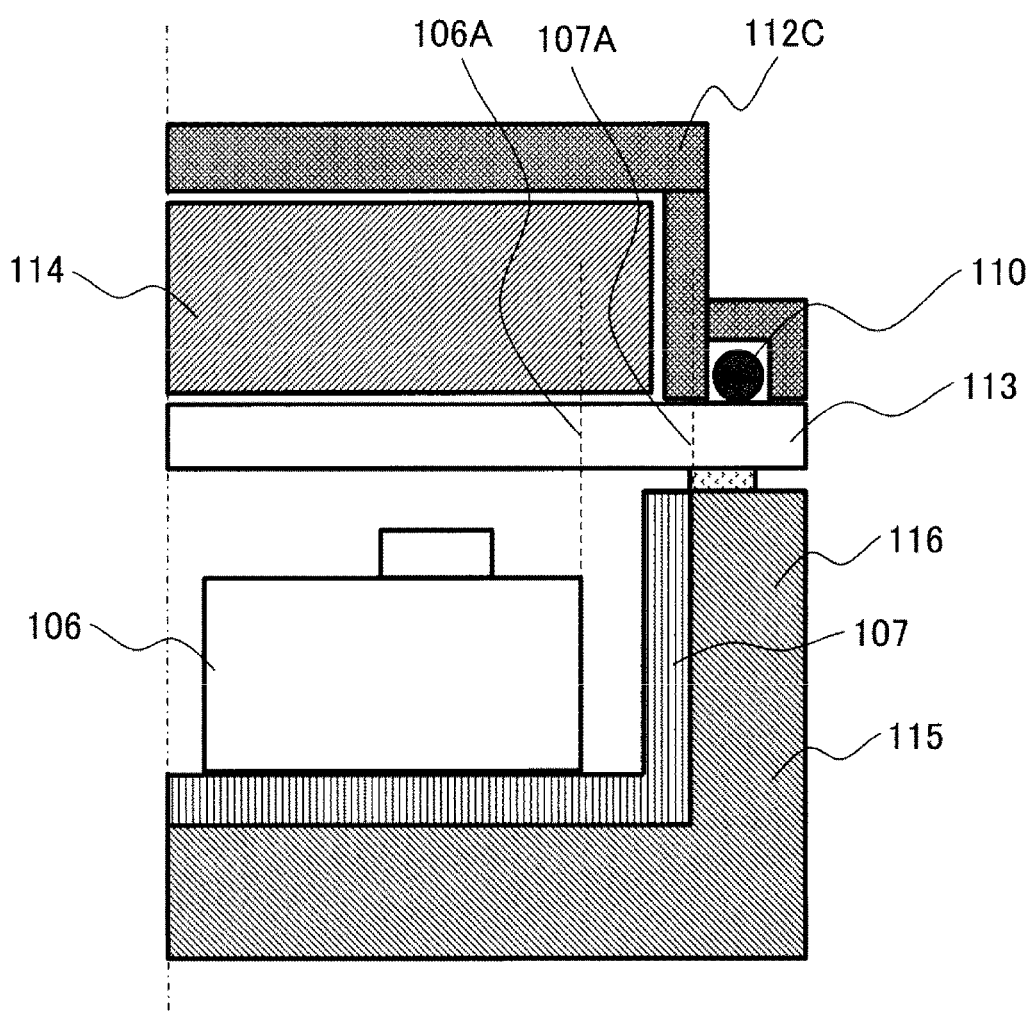

[FIG. 9]
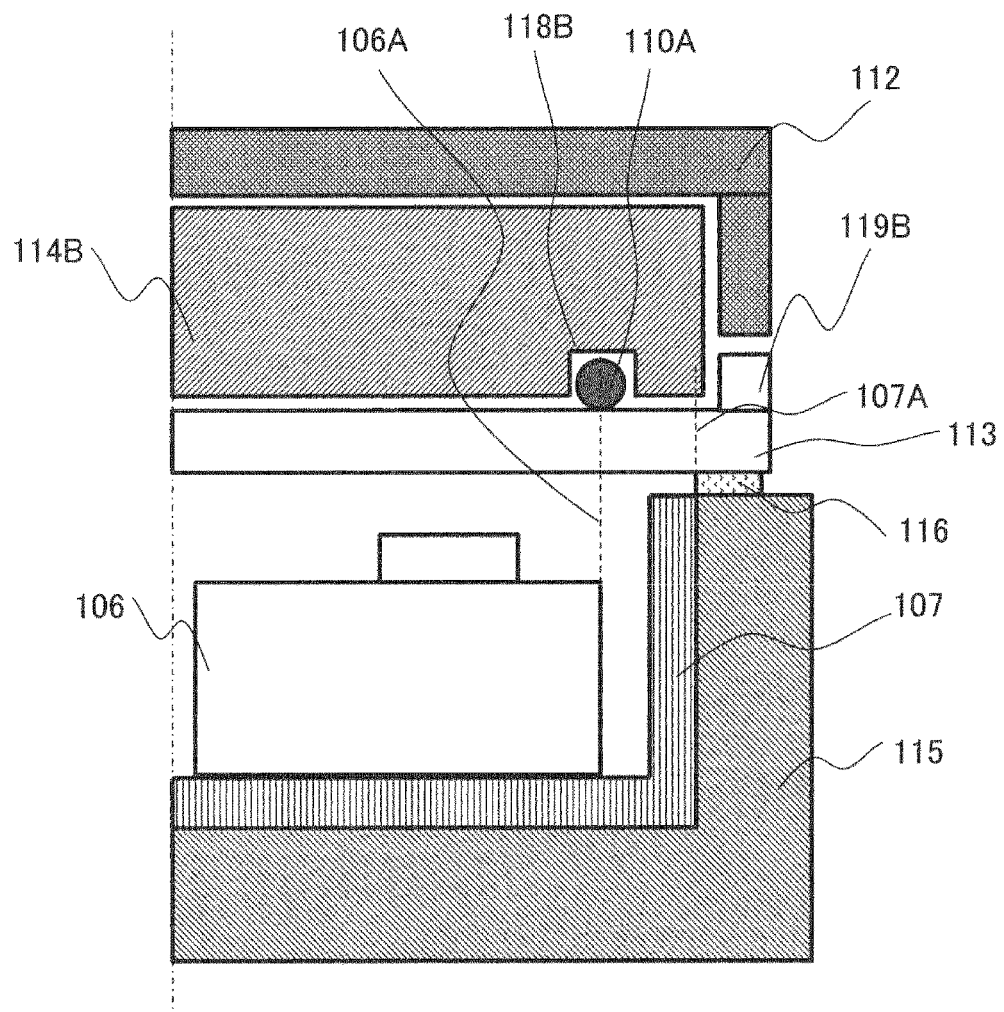

[FIG. 10]
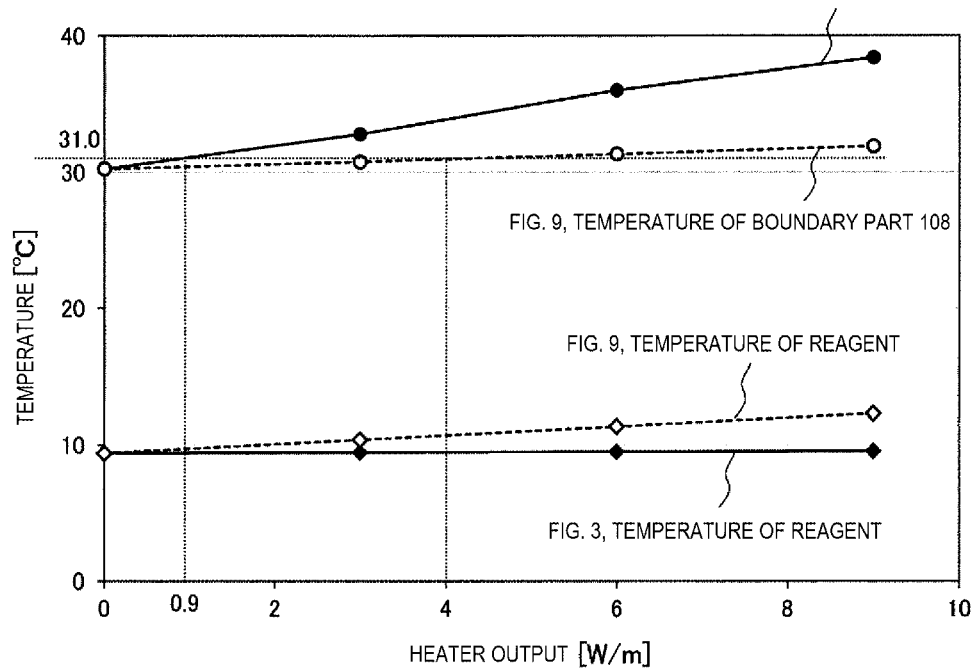

[FIG. 11]
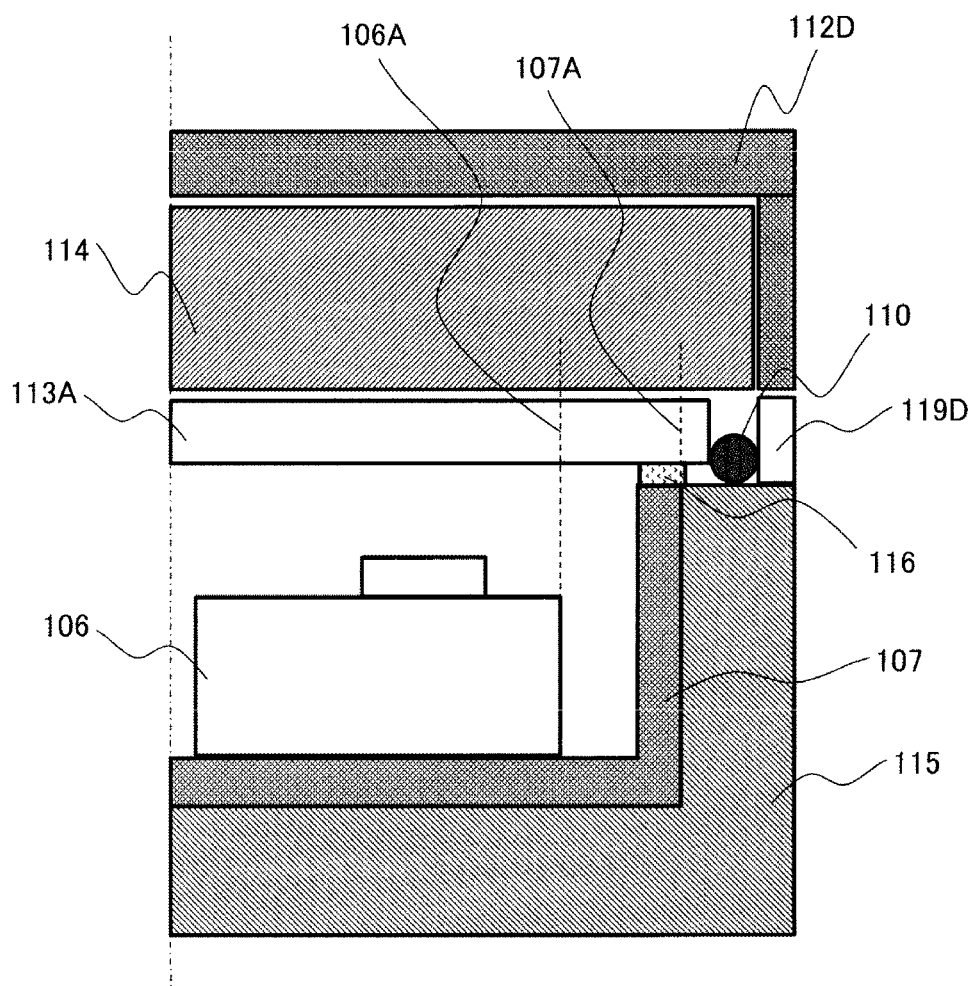

[FIG. 12]
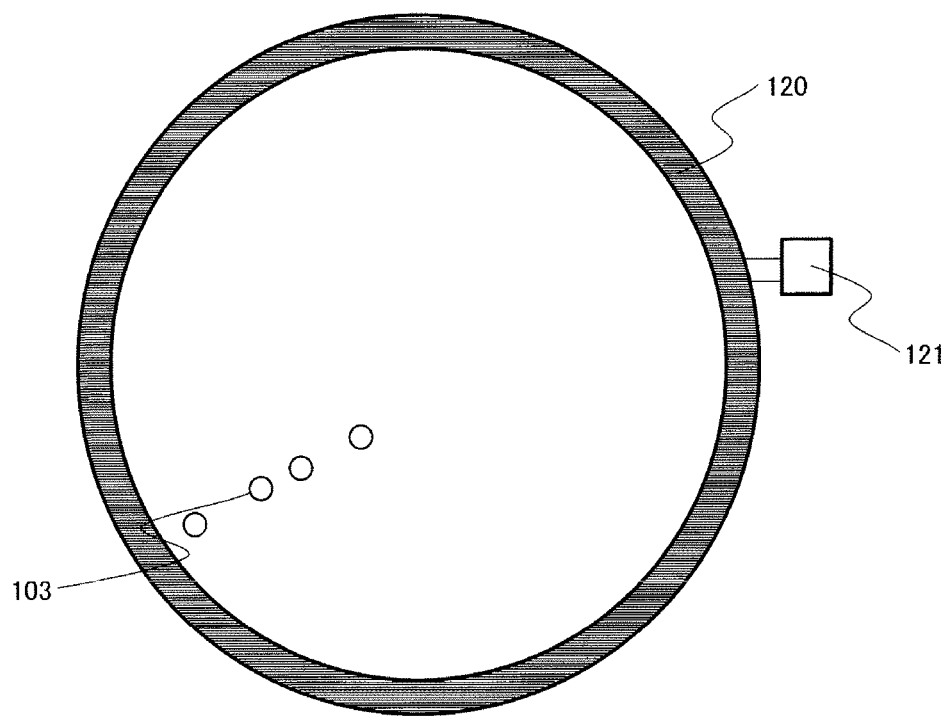

[FIG. 13]
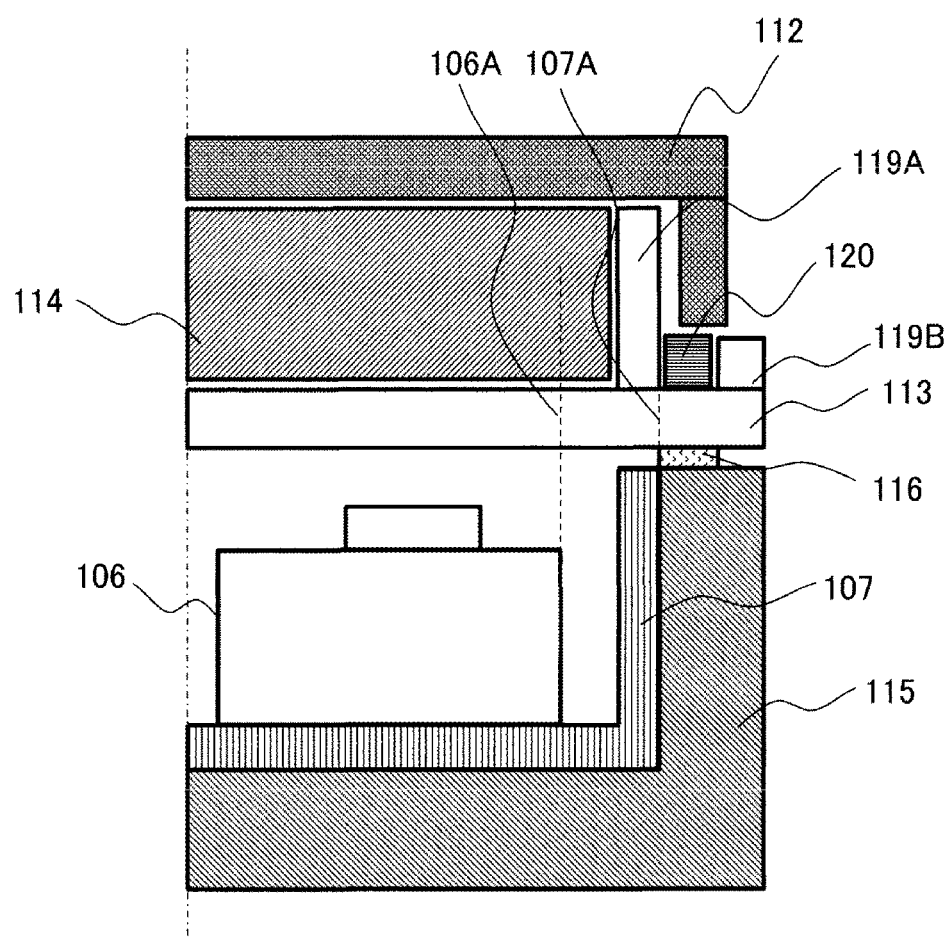

AUTOMATIC ANALYSIS DEVICE, COLD STORAGE, AND METHOD FOR COOLING REAGENT IN AUTOMATIC ANALYSIS DEVICE

TECHNICAL FIELD

The present invention relates to an automatic analysis device that mixes a biological sample such as plasma, serum, or urine with various reagents for analysis, a cooling box suitable for the automatic analysis device, and a method for refrigerating a reagent in the automatic analysis device.

BACKGROUND ART

As an example of an automatic analysis device that reduces power consumption with a simple configuration, JP-A-2018-0169278 (PTL 1) discloses an automatic analysis device that mixes a sample with a reagent suctioned from a suction hole provided in an upper portion of a reagent cooling box, the automatic analysis device including: a heat absorption unit that is provided in a lower portion of the reagent cooling box and cools an inner part of the reagent cooling box; and a warming unit that heats the suction hole with warm air produced together with cooling until the temperature of the suction hole exceeds a predetermined temperature, in which the warming unit is a warm air duct through which warm air flows from the lower portion of the reagent cooling box to the suction hole.

CITATION LIST

Patent Literature

PTL 1: JP-A-2018-0169278

SUMMARY OF INVENTION

Technical Problem

In the related art, an automatic analysis device that mixes a biological sample such as plasma, serum, or urine with various reagents for analysis is known. The analysis result obtained by the automatic analysis device includes many information during diagnosis of disease conditions.

Here, the reagent to be used includes various chemical material components depending on the type of the reagent. The reagent is required to be stored at a lower temperature than room temperature in order to suppress deterioration of a reagent component while the reagent is completely used after being loaded on the automatic analysis device. Therefore, most of the automatic analysis devices include a reagent cooling box.

In this reagent cooling box, there is a portion where dew condensation occurs in a high-temperature and high-humidity environment. For example, there is a reagent taking-out port for taking a reagent container into or out from the reagent cooling box or a window for reading reagent information.

In the former reagent taking-out port, when cold air of the cooling box inner part leaks from a gap between a door-like component of the taking-out port and a casing of the reagent cooling box, dew condensation is likely to occur near the joined portion. In addition, in the latter window for reading reagent information, the thickness of the window is small such that sufficient heat insulating properties cannot be secured, and thus dew condensation is likely to occur on a surface of the window.

When there is a portion from which cold air of a cooling box inner part leaks to the outside, dew condensation is likely to occur in this portion. In addition, when cold air of the reagent cooling box is transferred into a material and cools an outer surface of the reagent cooling box, dew condensation is likely to occur on the outer surface.

One example of the portion where dew condensation occurs is an outer peripheral side of a boundary part of a lid of the reagent cooling box.

The produced dew condensation water may have an effect such as water pouring on a peripheral component or production of mold on the device. Therefore, it is required to suppress this effect.

As a method of preventing dew condensation in a reagent cooling box, a method of providing a warm air duct on a reagent cooling box outer side to heat a reagent suction hole or an outer surface is disclosed as described above in PTL 1.

However, in this case, the outer diameter of the reagent cooling box increases by the amount corresponding to the volume of the warm air duct. In particular, in a medium and small-sized automatic analysis device, there is a case where it is difficult to secure a space of peripheral components such that the device size needs to be increased.

In addition, when the reagent cooling box is heated, it is necessary to pay attention to the effect of a reagent temperature on the cooling box inner part. Depending on the distance between the heated portion and the reagent, heating may interrupt significantly cooling of the reagent.

In particular, in the medium and small-sized automatic analysis device, a space that can be assigned to the method of preventing dew condensation of the cooling box due to overlapping with peripheral components. Therefore, the outer diameter of the reagent cooling box is desired to be set to a necessary minimum limit.

This way, regarding this reagent cooling box, a method of satisfying a trade-off relationship in which dew condensation is prevented by holding a reagent in an inner part at a cold temperature and increasing the temperature of a portion coming into contact with external air to reduce a temperature difference from room temperature.

An object of the present invention is to provide an automatic analysis device, a cooling box, and a cooling method for a reagent in the automatic analysis device capable of suppressing dew condensation on the outside of the reagent cooling box without increasing an outer diameter of the cooling box and without affecting a reagent temperature.

Solution to Problem

The invention includes a plurality of means for achieving the object, and one example thereof is an automatic analysis device that is configured to measure physical properties of a reaction liquid in which a sample and a reagent are dispensed respectively and reacted in a reaction container, the automatic analysis device including: a reagent cooling box that is configured to store a reagent container housing the reagent; and a heating unit that is disposed on a boundary part between a housing and a cooling box lid of the reagent cooling box to heat the boundary part. The heating unit is disposed on an outer side than an end portion of an outer peripheral side of the reagent cooling box in an end portion of the reagent container.

Advantageous Effects of Invention

According to the invention, dew condensation in a reagent cooling box outer part can be suppressed without increasing the outer diameter of the cooling box and without affecting a reagent temperature. Objects, configurations, and effects other than those described above will be clarified by describing the following embodiment.

BRIEF DESCRIPTION OF DRAWINGS

FIG. 1 is an overall configuration diagram of an embodiment of an automatic analysis device according to the invention.

FIG. 2 is a cross-sectional view schematically showing a structure of a reagent cooling box in the automatic analysis device of an embodiment.

FIG. 3 is a cross-sectional view showing an example of an arrangement of a heating unit in the reagent cooling box of the automatic analysis device of the embodiment.

FIG. 4 is a side view showing an arrangement of a power supply unit of the heating unit in the reagent cooling box of the automatic analysis device of the embodiment.

FIG. 5 is a top surface view showing the arrangement of the power supply unit of the heating unit in the reagent cooling box of the automatic analysis device of the embodiment.

FIG. 6 is a cross-sectional view showing another example of the arrangement of the heating unit in the reagent cooling box of the automatic analysis device of the embodiment.

FIG. 7 is a cross-sectional view showing another example of the arrangement of a heating unit in the reagent cooling box of the automatic analysis device of the embodiment.

FIG. 8 is a cross-sectional view showing another example of the arrangement of the heating unit in the reagent cooling box of the automatic analysis device of the embodiment.

FIG. 9 is a cross-sectional view showing another example of the arrangement of a heating unit in the reagent cooling box of the automatic analysis device of the embodiment.

FIG. 10 is a view showing an example of a change in temperature of a cooling box inner part and a cooling box boundary in the reagent cooling box of a structure shown in FIG. 3 and the reagent cooling box shown in FIG. 9.

FIG. 11 is a cross-sectional view showing another example of the arrangement of the heating unit in the reagent cooling box of the automatic analysis device of the embodiment.

FIG. 12 is a top surface view showing another example of the arrangement of the heating unit and a power supply unit in the reagent cooling box of the automatic analysis device of the embodiment.

FIG. 13 is a sectional view showing another example of the arrangement of a heating unit in the reagent cooling box of the automatic analysis device of the embodiment.

DESCRIPTION OF EMBODIMENTS

An embodiment of an automatic analysis device, a cooling box, and a method for refrigerating a reagent in the automatic analysis device according to the present invention will be described using FIGS. 1 to 13.

First, an example of an overall configuration of the automatic analysis device will be described using FIG. 1.

FIG. 1 is a diagram schematically illustrating the entire configuration of an automatic analysis device according to the embodiment.

An automatic analysis device 100 shown in FIG. 1 is configured to measure physical properties of a reaction liquid in which a sample and a reagent are dispensed respectively and reacted in a reaction container 30, the automatic analysis device 100 including: a specimen supply unit and storage unit 2; an analysis unit 3 including a reagent disk 21 and a reaction disk 31; and a control unit 1 that controls the entire configuration of the automatic analysis device 100.

The specimen supply unit and storage unit 2 is a mechanism for introducing a specimen container 10 housing a specimen, moving the specimen container 10 along a specimen transport path, transporting the specimen container 10 to the analysis unit 3.

The analysis unit 3 is a unit for measuring physical properties of a reaction liquid in which a sample and a reagent are dispensed respectively and reacted in a reaction container 30, and mainly includes a specimen transport path 11, a specimen information reading device 13, a specimen dispensing mechanism 12, the reaction disk 31, a reagent cooling box 24, a reagent information reading device 23, the reagent disk 21, a reagent dispensing mechanism 22, a mixing mechanism 36, a photometric system 37, and a cleaning mechanism 38.

The specimen transport path 11 is a transportation path for transporting the specimen container 10 supplied from the specimen supply unit and storage unit 2 to the vicinity of the specimen dispensing mechanism 12 and returning the specimen container 10 to the specimen supply unit and storage unit 2 after dispensing.

The specimen information reading device 13 is arranged at a predetermined position along the specimen transport path 11. The specimen information reading device 13 reads a specimen code that is fixed to a recording medium of the specimen container 10 arranged at a reading position facing thereto, and detects a loading status of a specimen on the specimen transport path 11 and information regarding the specimen.

In the reaction disk 31, a plurality of reaction containers 30 for reacting a sample (specimen) and a reagent to produce a reaction liquid are loaded in a disk circumferential direction.

The reagent disk 21 is positioned in the reagent cooling box 24, in which a plurality of reagent containers 20 housing a reagent are loaded in the disk circumferential direction. Each of the reagent containers 20 is configured to be attachable to and detachable from the reagent disk 21.

This reagent disk 21 is configured to be rotatable by a driving unit (not shown). In the reagent disk 21, due to this rotation, one reagent container 20 among the plurality of loaded reagent containers 20 can be arranged at a predetermined position in the disk circumferential direction.

In addition, the reagent cooling box 24 is a cooling box that refrigerates a reagent container 106 housing a reagent for each of the reagent disks 21, and refrigerates the reagent in a given temperature range. For example, in the case of a reagent cooling box of the analysis unit 3 that analyzes a biochemical analysis item shown in FIG. 1, a reagent is required to be stored in a reagent temperature range of 5° C. to 15° C. On the other hand, in the case of a reagent cooling box of the analysis unit that analyzes an immunoassay item, a reagent is required to be stored in a reagent temperature range of about 10±2° C.

The detailed structure of the reagent cooling box 24 will be described below.

The reagent information reading device 23 is arranged at a predetermined position in a circumferential direction of the reagent disk 21. The reagent information reading device 23 reads a reagent code that is fixed to a recording medium of the reagent container 20 arranged at a reading position facing thereto. The reagent information reading device 23 reads the reagent code of the reagent container 20 such that a loading status of each of a specimen and a reagent on the reagent disk 21 can be detected.

The specimen dispensing mechanism 12 is arranged between the specimen transport path 11 and reaction disk 31, and the reagent dispensing mechanism 22 is arranged between the reagent disk 21 and the reaction disk 31. Each of the specimen dispensing mechanism 12 and the reagent dispensing mechanism 22 includes: a movable arm; and a dispensing nozzle that is formed of a pipette nozzle attached to the movable arm.

The specimen dispensing mechanism 12 dispenses a specimen into the reaction container 30 on the reaction disk 31, and the reagent dispensing mechanism 22 dispenses a reagent into the reaction container 30. As a result, a mixed solution, that is, a reaction liquid is produced.

In order to produce the reaction liquid, the specimen dispensing mechanism 12 linearly moves along the specimen transport path to suction a predetermined amount of specimen from the specimen container 10 arranged at a specimen suction position, and houses the specimen in the dispensing nozzle. The specimen dispensing mechanism 12 executes a specimen dispensing operation of discharging the specimen housed in the dispensing nozzle into the reaction container 30 arranged at a specimen discharge position due to the rotation of the reaction disk 31.

On the other hand, the reagent dispensing mechanism 22 suctions a predetermined amount of reagent from the reagent container 20 arranged at a reagent suction position due to the rotation of the reagent disk 21 and houses the reagent in the dispensing nozzle. The reagent dispensing mechanism 22 executes a reagent dispensing operation of discharging the reagent housed in the dispensing nozzle into the reaction container 30 arranged at a reagent discharge position due to the rotation of the reaction disk 31.

On the circumference of the reaction disk 31, the mixing mechanism 36, the photometric system 37, the cleaning mechanism 38, and the like are arranged at different work positions together with the specimen dispensing mechanism 12 and the reagent dispensing mechanism 22.

The mixing mechanism 36 mixes the reaction liquid that is dispensed into the reaction container 30 and produced by the specimen dispensing mechanism 12 and the reagent dispensing mechanism 22. As a result, the reaction liquid in the reaction container 30 is uniformly mixed to accelerate the reaction.

In the photometric system 37, a light source (not shown) and an absorptiometer (not shown) are arranged to face each other with respect to a photometric position through which the reaction container 30 passes in conjunction with the rotation of the reaction disk 31. The photometric system 37 houses the reaction liquid and irradiates the reaction container 30 positioned at the photometric position between the light source and the absorptiometer with measurement light from the light source such that the transmitted light is measured by the absorptiometer. As a result, the absorbance is measured whenever the reaction liquid in each of the reaction containers 30 passes through the photometric position of the photometric system 37 due to rotational displacement caused by intermittent rotation of the reaction disk 31.

The cleaning mechanism 38 disposes the reaction liquid in the reaction container 30 loaded on the reaction disk 31 after completion of analysis of a requested item, and cleans the inside of the container for analysis of a new requested item. Each of the plurality of reaction containers 30 loaded on the reaction disk 31 can be repeatedly used for analysis due to the cleaning mechanism 38.

Referring back to FIG. 1, the control unit 1 controls the entire operation of the automatic analysis device 100, and includes a display unit 40, an input unit 44, a storage unit 43, and a control unit 42.

The display unit 40 is a display device such as a liquid crystal display that displays an input screen of various parameters or settings required for analysis, analysis inspection data for an initial inspection or a re-inspection, information regarding a progress status of analysis, a measurement result, and the like.

The input unit 44 is a device for inputting instructions such as various parameters or settings, analysis request information, or analysis star, and is configured with a keyboard or a mouse. When the display unit 40 is a touch panel type, this input unit is integrated with the display unit 40.

The storage unit 43 is a device that stores various parameters or settings, a measurement result, analysis request information of a specimen that is housed in the specimen container 10 loaded on each of specimen racks, and the like, and is configured with a semiconductor memory such as a flash memory or a magnetic disk such as an HDD. This storage unit 43 stores various computer programs or the like for controlling the operation of each of the devices in the automatic analysis device 100 or executing various display processes and the like.

The control unit 42 is a computer including a CPU, a memory, or the like, controls various operations of the members, and executes arithmetic processing of acquiring the concentration of a predetermined component in the specimen based on the detection result executed by the analysis unit. The control of the operations of the devices by the control unit 42 is executed based on various programs stored in the storage unit 43.

The control processes of the operations executed by the control unit 42 may be collectively executed by one program or may be executed individually by a plurality of programs, or a combination thereof may be adopted. In addition, some or all of the programs may be implemented by dedicated hardware or may be modularized.

FIG. 1 shows a configuration in which one analysis unit 3 is connected to one specimen supply unit and storage unit 2. However, an automatic analysis device in which two or more analysis units are connected to the specimen supply unit and storage unit 2 can also be adopted.

When two or more analysis units are connected, the configuration of the analysis units is not particularly limited, and not only the analysis unit shown in FIG. 1 that executes biochemical analysis but also, for example, an analysis unit that executes immunological analysis can be connected. In addition, a measuring unit for electrolyte concentration measurement, a unit for blood clotting analysis, or the like can be appropriately added to the analysis unit to be connected. Further, a plurality of analysis units may have the same configuration.

Next, the details of the structure of the reagent cooling box 24 of the automatic analysis device 100 according to the embodiment will be described using FIGS. 2 to 13. FIG. 2 is a cross-sectional view schematically showing the reagent cooling box according to the embodiment of the invention. FIG. 3 is a diagram showing one example of an arrangement method of a heater.

As shown in FIG. 2, the reagent cooling box 24 mainly includes a casing 101 that has a function of refrigerating a reagent, a cooling box lid 102, and a heater 110.

The casing 101 includes: a cooling oven 107 that cools the reagent container 106; and a cooling box heat insulating material 115 that is arranged on an outer peripheral side of the cooling oven 107.

In the cooling oven 107, a flow path (not shown) through which a refrigerant can pass is formed. By the refrigerant passing through the flow path, air in the reagent cooling box 24 is cooled. A representative example of the refrigerant is water. However, the refrigerant may be air or the like.

As shown in FIG. 3, the cooling box lid 102 includes: a bottom lid 113 that covers an upper surface side of the cooling oven 107; a lid heat insulating material 114 that is arranged on an upper surface side of the bottom lid 113; and an upper lid 112 that covers an upper surface side of the lid heat insulating material 114.

In the cooling box lid 102, as shown in FIG. 2, a reagent suction hole 103 is provided such that a reagent probe 104 of the reagent dispensing mechanism 22 accesses the reagent suction hole 103 from the reagent cooling box 24 to suction a reagent in the reagent cooling box 24. The reagent is moved circumferentially by a rotary drive system 105 arranged below the center of the casing 101. As a result, the reagent probe 104 can access the same reagent suction hole to suction each reagent.

The heater 110 is arranged as a heating unit at a boundary part 108 between the casing 101 and the cooling box lid 102 that is an outer peripheral part of the reagent cooling box 24. By directly heating the boundary part 108 with the heater 110, the surface temperature is higher than a temperature (dew point) at which dew condensation occurs, and dew condensation is suppressed.

The heater 110 is an electric heating wire such as a nichrome wire having a diameter of about 2 mm and generates heat by Joule heating.

As shown in FIG. 3, the heater 110 is desirablely arranged on an outer side than an end portion 106A of an outer peripheral side of the reagent cooling box 24 in an end portion of the reagent container 106. More preferably, it is desirable that the heating unit is arranged on an outer side than an end part 107A of an outer peripheral side of the cooling oven 107 that cools an inner part of the reagent cooling box 24.

In addition, as shown in FIG. 3, the heater 110 is arranged on the cooling box lid 102 side in the boundary part 108. At this time, a groove where the heater 110 can be arranged is provided on an outer peripheral side of an upper surface of the bottom lid 113.

This heater 110 is fixed by being surrounded by a member constituting the reagent cooling box 24, the bottom lid 113 in FIG. 3, a first rib 119A that fixes the lid heat insulating material 114, a second rib 119B provided on an outermost peripheral part on an upper surface side of the bottom lid 113, and upper lids 112 and 112A.

It is desirable that the width of a groove that is formed by the first rib 119A and the second rib 119B and fixes the heater 110 is wider (for example, about 3 mm) than a cross-sectional width of the heater 110. In addition, it is desirable that the height is more than 1 time and 1.5 times or less with respect to the height of the heater 110. As a result, the heater 110 is arranged without a cross-sectional shape being changed and collapsed and without flying out from the cooling box lid 102. In this method, another component is not added for the arrangement. Therefore, the heater 110 can be easily arranged in the boundary part 108.

The first rib 119A also functions to fix the lid heat insulating material 114. Therefore, it is desirable that the height of the first rib 119A is the same as the height of a higher one among the lid heat insulating material 114 and the heater 110.

In the embodiment, the effect of suppressing dew condensation can be obtained without depending on the outer diameter dimension of the casing 101 of the heater. The outer diameter dimension depends on only the thickness of the cooling box heat insulating material 115, and the thickness can be set to a value required to prevent dew condensation from occurring in the surface of the cooling box heat insulating material 115 during cooling from the cooling oven 107. When the thickness of the cooling box heat insulating material 115 is set to necessary minimum limit, dew condensation can be suppressed with maintaining the external dimension.

The cooling box heat insulating material 115 is formed of a material having low thermal conductivity such as foamed polystyrene.

In addition, as in the cooling box heat insulating material 115, the lid heat insulating material 114 is formed of a material having low thermal conductivity such as foamed polystyrene.

The bottom lid 113 is formed of a material having the same hardness as an ABS resin or the like and having low thermal conductivity.

On the other hand, the upper lid 112 is not particularly limited and is formed of an ABS resin or the like as in the bottom lid 113.

FIGS. 4 and 5 show an example of an arrangement method of a power supply unit of a heat source of the heater 110. FIG. 4 is a diagram showing the reagent cooling box 24 when seen from a side surface side of the automatic analysis device 100, and FIG. 5 is a diagram showing the reagent cooling box 24 when seen from an upper surface of the automatic analysis device 100.

As shown in FIGS. 4 and 5, the heater 110 arranged in the boundary part 108 protrudes outward from a step part 118A that is provided in a part of the outer circumference and is connected to a power supply unit for heater 117, and the entire portion of the reagent cooling box 24 in the circumferential direction is heated.

It is desirable that the output of the power supply unit for heater 117 is fixed to a necessary minimum limit output.

The necessary minimum limit of the output in the invention can be determined by experimentally obtaining a heater output where dew condensation does not occur in a region around the side surface side of the second rib 119B of the reagent cooling box 24 in, for example, an upper limit temperature and an upper limit humidity (for example, conditions of temperature: 32 degrees and humidity: 80%) of a guarantee range of the operation of the automatic analysis device 100.

In this case, the output of the power supply unit for heater 117 does not need to be the necessary minimum limit and can also be controlled by measuring at least one among inner and outer temperatures of the reagent cooling box 24 and using at least one among the measured values.

In addition, the entire portion of the heater 110 in the circumferential direction does not need to be heated as shown in FIG. 5, and at least a part of the outer peripheral part of the cooling box may be heated. However, in order to effectively suppress dew condensation, it is desirable that at least half of the circumference, more preferably, ¾ or more of the circumference is heated.

FIG. 6 shows an example of a different arrangement method of the heater 110. In another embodiment shown in FIG. 6, the heater 110 heats the boundary part directly as in the arrangement of FIG. 3.

In the configuration shown in FIG. 6, an upper end surface of a first rib 119C and an upper end surface of the second rib 119B are arranged on the same plane, and the heater 110 is fixed by the bottom lid 113, the first rib 119C, the second rib 119B, and an upper lid 112A.

In the upper lid 112A, a portion that fixes the heater 110 has a flat surface shape.

The width of a groove that is formed by the first rib 119C and the second rib 119B between the upper lid 112A and the bottom lid 113 is wider than a cross-sectional width of the heater 110, and it is desirable that the height of the groove is more than 1 time and 1.5 times or less with respect to the height of the heater 110.

FIG. 7 shows an example of a different arrangement method of the heater 110.

In the configuration shown in FIG. 7, a step part 118A is provided on a lower surface side of an outer peripheral part of a lid heat insulating material 114A and forms a groove where the heater 110 is arranged between the bottom lid 113 and the lid heat insulating material 114A. As in the configuration shown in FIG. 6, the groove is formed by the first rib 119C and the second rib 119B.

In the configuration shown in FIG. 7, the heater 110 is fixed by the bottom lid 113, the first rib 119C that fixes the lid heat insulating material 114 formed on the upper surface side of the bottom lid 113, the second rib 119B provided on the outermost peripheral part on the upper surface side of the bottom lid 113, and the step part 118A of the lid heat insulating material 114A.

As in the case of FIG. 6, the width of the groove that is formed by the first rib 119C and the second rib 119B is wider than a cross-sectional width of the heater 110, and it is desirable that the height of the groove is more than 1 time and 1.5 times or less with respect to the height of the heater 110.

FIG. 8 shows an example of a different arrangement method of the heater 110.

In the configuration shown in FIG. 8, the heater 110 is fixed by the bottom lid 113 and a groove provided in an upper lid 112C. As a result, even when the groove structure cannot be provided in the bottom lid 113, the heater 110 that heats the boundary part 108 can be arranged.

FIG. 9 shows an example of an arrangement method of the heater 110.

In the configuration shown in FIG. 9, a heater 110A is arranged on the outer side than the end portion 106A of the outer peripheral side of the reagent cooling box 24 in the end portion of the reagent container 106 but is arranged on an inner side than the end part 107A of the outer peripheral side of the cooling oven 107 that cools an inner part of the reagent cooling box 24. In this case, a recess part 118B for arranging the heater 110A in a lid heat insulating material 114B is provided over the entire circumference of the lower surface side in the circumferential direction.

Even in this arrangement, the boundary part 108 can be heated by heat transfer in the cooling box lid 102. On the other hand, there is a concern in that, since the heater 110A is near the inside of the reagent cooling box 24, it is desirable to pay attention to the temperature of the reagent.

A specific temperature effect will be described using FIG. 10.

Regarding the arrangements of the heaters 110 and 110A shown in FIGS. 3 and 9, FIG. 10 shows the reagent temperature and the temperature effect on the boundary part 108 when the outputs of the heaters 110 and 110A are changed.

The data in FIG. 10 is an example of data where the temperature at each of the portions is analyzed based on the structure of FIG. 3 or 9.

In the configuration shown in FIG. 3, as shown in FIG. 10, as the output of the heater 110 increases, the temperature of the boundary part 108 increases, but the reagent temperature does not substantially change. Therefore, it was found that there is a distance between a reagent in the reagent cooling box 24 and the heater 110 on the outer circumference of the cooling box lid 102, and even when the output of the heater 110 increases, there is substantially no effect on the reagent temperature. In addition, it was also found that the output of the heater 110 required to set the temperature of the boundary part 108 to be the dew point or higher only needs to be 0.9 [W/m].

On the other hand, it was found that, in the configuration shown in FIG. 9, as the output of the heater 110A increases, the temperature of the boundary part 108 increases, but the change rate is lower than that of the configuration shown in FIG. 3. It was found that the output of the heater 110A required to set the temperature of the boundary part 108 to be the dew point or higher in the configuration shown in FIG. 9 is 4.0 [W/m] or higher which is higher than that of the configuration of FIG. 3.

In addition, it was found that, at this time, there is an effect in that the reagent temperature is 1.2° C. higher than that of the configuration shown in FIG. 3 and it is desirable to take a countermeasure of, for example, decreasing the temperature of the refrigerant flowing through the cooling oven 107 or increasing the flow rate thereof by the amount corresponding to the effect.

It was obvious from the above-described examples that, by setting the outer diameter of the circumference where the heater 110 is arranged to be more than that of the outer side end part 107A of the cooling oven 107, the effect capable of heating the boundary part 108 can be effectively obtained while reducing the effect of increasing the reagent temperature.

FIG. 11 shows an example of a different arrangement method of the heater 110. In another embodiment shown in FIG. 11, the heater 110 heats the boundary part directly as in the arrangement of FIG. 3.

In the configuration shown in FIG. 11, the heater 110 is arranged on a side surface side of a bottom lid 113A and an upper surface of the cooling box heat insulating material 115 instead of the upper side of the bottom lid 113A. Even in this arrangement, dew condensation can be prevented.

FIGS. 12 and 13 show an example of a different unit for heating the boundary part.

In the configuration shown in FIG. 3 or the like, the linear heater 110 is arranged on the circumference of the boundary part 108. On the other hand, as shown in FIGS. 12 and 13, a heat transfer material 120 having high thermal conductivity is arranged on the same circumference of the boundary part 108 of the reagent cooling box 24 instead of the heater 110, and one or more heat generating units 121 of heating the heat transfer material 120 are connected.

As the heat transfer material 120, for example, a ring formed of aluminum, copper, or the like and a sheet formed of a material having high thermal conductivity can be used.

Although the details of the heat generating units 121 are not particularly limited, the heat generating units 121 can be configured with a material of converting electricity into Joule heat, a power supply, and the like as in the heater 110.

FIGS. 12 and 13 show the case where the heat transfer material 120 is arranged instead of the heater 110 in FIG. 3. The heat transfer material 120 can be arranged at the position of the heater 110 in FIG. 6, 7, 8, 9, or 11.

Next, the effect of the embodiment will be described.

The automatic analysis device 100 according to the embodiment is a device that is configured to measure physical properties of reaction liquid in which a sample and a reagent are dispensed respectively and reacted in a reaction container 30, and includes the reagent cooling box 24 that is configured to store the reagent container 106 housing the reagent, and the heater 110 or 110A or the heat transfer material 120 that is arranged on the outer peripheral part of the reagent cooling box 24 to heat the outer peripheral part.

With the above-described configuration, the occurrence of dew condensation in a boundary part 118 such as an outer peripheral part of the bottom lid 113, an outer peripheral part of an upper lid 112, 112A, 112B, 112C, or 112D close to the bottom lid 113, or an upper end-side outer peripheral part of the cooling box heat insulating material 115 can be further suppressed than in an automatic analysis device having a configuration in the related art, the dew condensation being presumed to occur when air in a gap of the cooling box lid 102 leaks to the outside of the reagent cooling box 24 due to cold air of the reagent cooling box 24. In addition, since the heater 110 or the like is arranged in the outer peripheral part of the reagent cooling box 24, the outer diameter size of the reagent cooling box 24 does not need to be increased. Due to these effects, dew condensation can be suppressed with the configuration where the necessary minimum limit is the outer diameter.

In addition, the heater 110 or the like is arranged on the outer side than the end portion 106A of the outer peripheral side of the reagent cooling box 24 in the end portion of the reagent container 106. Therefore, the reagent can be suppressed by being heated by itself, and energy saving can be implemented.

Further, the heater 110 or the like is arranged on the outer side than the end part 107A of the outer peripheral side of the cooling oven 107 that cools the inner part of the reagent cooling box 24. As a result, the reagent can be more reliably suppressed from being heated by itself, and the region heated by the heater 110 or the like can be arranged closer to the boundary part 118 side. Therefore, energy saving of the output for heating or cooling can be more reliably implemented.

In addition, the heater 110 or the like is fixed by the member constituting the reagent cooling box 24. As a result, a member for fixing the heater 110 or the like does not need to be prepared separately, the manufacturing of the reagent cooling box 24 can be further simplified, and the costs can be reduced.

Further, the reagent cooling box 24 includes, as the members: the cooling oven 107 that cools the reagent container 106; the cooling box heat insulating material 115 that is arranged on the outer peripheral side of the cooling oven 107; the bottom lid 113 that covers an upper surface side of the cooling oven 107; the lid heat insulating material 114 that is arranged on the upper surface side of the bottom lid 113; and the upper lids 112, 112A, 112B, 112C, and 112D that cover the upper surface side of the lid heat insulating material 114, in which the heater 110 or the like is arranged on the upper surface side of the outer peripheral part of the bottom lid 113. As a result, when cold air present in a gap between the bottom lid 113 and the lid heat insulating material 114 leaks, the reagent cooling box 24 can be more effectively heated. Therefore, the occurrence of dew condensation can be more effectively suppressed.

In addition, this heater 110 or the like is surrounded by the bottom lid 113, the first rib 119A that fixes the lid heat insulating material 114, the second rib 119B provided on the outermost peripheral part on the upper surface side of the bottom lid 113, and the upper lids 112 and 112A. As a result, the heater 110 or the like can be fixed with the simple configuration, the manufacturing is simple, and the costs can also be reduced.

Further, the upper end surface of a first rib 119C and the upper end surface of the second rib 119B are arranged on the same plane. As a result, the bottom lid 113 has a shape where the rib (first rib 119A) having a high aspect ratio is not required, and there is an advantageous effect in that the bottom lid 113 can be easily processed.

In addition, the step part 118A is provided on the lower surface side of the outer peripheral part of the lid heat insulating material 114A and the heater 110 or the like is surrounded by the bottom lid 113, the first rib 119C that fixes the lid heat insulating material 114 formed on the upper surface side of the bottom lid 113, the second rib 119B provided on the outermost peripheral part on the upper surface side of the bottom lid 113, and the step part 118A of the lid heat insulating material 114A. As a result, both the bottom lid 113 and the upper lid 112A have a simple shape, and there is an advantageous effect in that the bottom lid 113 and the upper lid 112A can be easily processed.

Further, the heater 110 or the like is surrounded by the bottom lid 113 and the groove provided in the upper lid 112C. Even in this case, the heater 110 or the like can be fixed with the simple configuration, the manufacturing is simple, and the costs can also be reduced.

In addition, the heating unit includes the linear heater 110 and the power supply unit for heater 117 that supplies a current to the heater 110. As a result, the boundary part 108 of the outer peripheral side of the reagent cooling box 24 can be uniformly heated with the simple configuration, and the occurrence of dew condensation can be more effectively suppressed.

In addition, the heating unit includes: the heat transfer material 120 that is arranged on the outer peripheral part of the reagent cooling box 24; and the heat generating unit 121 that applies heat to the heat transfer material 120. As a result, by locally securing a space for arranging the heat generating unit 121, dew condensation can be suppressed without increasing the outer diameter dimension of the casing 101.

Further, the output of the power supply unit for heater 117 or the heat generating unit 121 is set to the necessary minimum limit. As a result, energy saving can be implemented, and dew condensation can be more effectively suppressed.

In addition, the output of the power supply unit for heater 117 or the heat generating unit 121 is set to a condition in which dew condensation does not occur in the outer peripheral part of the reagent cooling box 24 at temperature and humidity at an upper limit of a guarantee range of operation of the automatic analysis device 100. As a result, while implementing energy saving, the occurrence of dew condensation in the outer peripheral part of the reagent cooling box 24 can be more effectively suppressed without depending on the operating environment of the automatic analysis device 100.

Others

The present invention is not limited to the above-described embodiment, and various modifications and applications can be made. The embodiment has been described in detail in order to easily describe the present invention, and the present invention is not necessarily to include all the configurations described above.

For example, by adding the same configurations as the heater 110 and the power supply unit for heater 117 or adding the heat transfer material 120 and the heat generating unit 121 to the outer peripheral part of the reagent cooling box 24 of the automatic analysis device 100 that is previously used by a customer and fixing the components, dew condensation in the outer peripheral part of the reagent cooling box 24 can be effectively suppressed even in the existing automatic analysis device 100.

REFERENCE SIGNS LIST

1: control unit
2: specimen supply unit and storage unit
3: analysis unit
10: specimen container
11: specimen transport path
12: specimen dispensing mechanism
13: specimen information reading device
20: reagent container
21: reagent disk
22: reagent dispensing mechanism
23: reagent information reading device
24: reagent cooling box
30: reaction container
31: reaction disk
36: mixing mechanism
37: photometric system
38: cleaning mechanism
40: display unit
42: control unit
43: storage unit
44: input unit
100: automatic analysis device
101: casing
102: cooling box lid
103: reagent suction hole
104: reagent probe
105: rotary drive system
106: reagent container
106A: end portion
107: cooling oven (cooling device)
107A: outer side end part
108: boundary part
110, 110 A: heater (electric heating wire, heating unit)
112, 112A, 112B, 112C, 112D: upper lid (second lid)
113, 113A: bottom lid (first lid)
114, 114A, 114B: lid heat insulating material
115: cooling box heat insulating material
116: sponge-shaped heat insulating material
117: power supply unit for heater (power supply, heating unit)
118A: step part
118B: recess part
119A, 119C: first rib
119B: second rib
120: heat transfer material (heating unit)
121: heat generating unit (heating unit)

The invention claimed is:

1. An automatic analysis device that is configured to measure physical properties of a reaction liquid in which a sample and a reagent are dispensed respectively and reacted in a reaction container, the automatic analysis device comprising:
a reagent cooling box that is configured to store a reagent container housing the reagent; and
a heating unit that is disposed on a boundary part between a housing and a cooling box lid of the reagent cooling box to heat the boundary part, wherein
the heating unit is disposed on an outer side than an end portion of an outer peripheral side of the reagent cooling box in an end portion of the reagent container.

2. The automatic analysis device according to claim 1, wherein
the heating unit is disposed on an outer side than an end portion of an outer peripheral side of a cooling device that cools an inner part of the reagent cooling box.

3. The automatic analysis device according to claim 1, wherein
the heating unit is fixed by a member constituting the reagent cooling box.

4. The automatic analysis device according to claim 3, wherein
the reagent cooling box includes, as the member, a cooling device that is configured to cool the reagent container, a cooling box heat insulating material that is disposed on the outer peripheral side of the cooling device, a first lid that covers an upper surface side of the cooling device, a lid heat insulating material that is disposed on the upper surface side of the first lid, and a second lid that covers the upper surface side of the lid heat insulating material, and
the heating unit is disposed on an upper surface side of an outer peripheral part of the first lid.

5. The automatic analysis device according to claim 4, wherein
the heating unit is surrounded by the first lid, a first rib that is configured to fix the lid heat insulating material, a second rib that is provided on an outermost peripheral part of an upper surface side of the first lid, and the second lid.

6. The automatic analysis device according to claim 5, wherein
an upper end surface of the first rib and an upper end surface of the second rib are arranged on a same plane.

7. The automatic analysis device according to claim 4, wherein
a step part is provided on a lower surface side of an outer peripheral part of the lid heat insulating material, and
the heating unit is surrounded by the first lid, a first rib that is configured to fix the lid heat insulating material formed on the upper surface side of the first lid, a second rib that is provided on the outermost peripheral part of the upper surface side of the first lid, and the step part of the lid heat insulating material.

8. The automatic analysis device according to claim 4, wherein
the heating unit is surrounded by the first lid and a groove provided in the second lid.

9. The automatic analysis device according to claim 1, wherein
the heating unit includes a linear heating wire and a power supply that is configured to supply a current to the heating wire.

10. The automatic analysis device according to claim 1, wherein
the heating unit includes a heat transfer material disposed on the outer peripheral part of the reagent cooling box, and a heat generating unit that applies heat to the heat transfer material.

11. The automatic analysis device according to claim 1, wherein
the output of the heating unit is set to a necessary minimum limit.

12. The automatic analysis device according to claim 11, wherein
the output of the heating unit is set to a condition in which dew condensation does not occur in the outer peripheral part of the reagent cooling box at temperature and humidity at an upper limit of a guarantee range of operation of the automatic analysis device.

13. The automatic analysis device according to claim 1, wherein
the heating unit is arranged along a circumference of the boundary part between the housing and the cooling box lid.

14. A cooling box comprising:
a cooling device that is configured to cool an article housed in an inner side of the cooling device; and
a heating unit that is disposed on a boundary part between a housing and a cooling box lid of the cooling box to heat the boundary part, wherein
the heating unit that is disposed on an outer side than an end portion of an outer peripheral side of the cooling box in an end portion of the article.

15. The cooling box according to claim 14, wherein
the heating unit is arranged along a circumference of the boundary part between the housing and the cooling box lid.

16. A method for refrigerating a reagent in an automatic analysis device, the method comprising:
disposing a heating unit for heating a boundary part between a housing and a cooling box lid of a reagent cooling box for storing a reagent container housing a reagent for reacting with a sample, on an outer side than an end portion of an outer peripheral side of the reagent cooling box in an end portion of the reagent container in the boundary part; and
cooling an inner side of the reagent cooling box such that a temperature at the inner side of the reagent cooling box satisfies a storage condition of the reagent, and heating the boundary part of the reagent cooling box by the heating unit.

17. The method according to claim 16, wherein
the heating unit is arranged along a circumference of the boundary part between the housing and the cooling box lid.

* * * * *